(12) United States Patent
Lloyd (10) Patent No.: US 6,275,687 B1
(45) Date of Patent: Aug. 14, 2001

(54) APPARATUS AND METHOD FOR IMPLEMENTING A LOW-NOISE AMPLIFIER AND MIXER

(75) Inventor: Stephen L. Lloyd, Irvine, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/201,643

(22) Filed: Nov. 30, 1998

(51) Int. Cl.[7] .............................. H04B 1/18; H04B 1/26
(52) U.S. Cl. ...................... 455/292; 455/323; 330/296
(58) Field of Search .................... 455/313, 323, 455/325, 326, 333, 343, 575, 341, 280, 292; 327/113; 330/295, 296, 310, 124 R, 127, 98–100, 132–134, 150

(56) References Cited

U.S. PATENT DOCUMENTS

| | | | |
|---|---|---|---|
| 4,935,705 | * | 6/1990 | Estanislao et al. ............... 330/296 |
| 5,166,639 | * | 11/1992 | Green et al. ....................... 330/99 |
| 5,280,648 | * | 1/1994 | Dobrovolny ...................... 455/326 |
| 6,057,714 | * | 5/2000 | Andrys et al. .................... 455/326 |

* cited by examiner

Primary Examiner—Nguyen T. Vo
(74) Attorney, Agent, or Firm—Knobbe, Martens, Olson & Bear, LLP (57) ABSTRACT

Disclosed is an apparatus for modifying a radio frequency signal. In one embodiment, the apparatus includes a mixer, an amplifier module and an interface circuit. The mixer is configured to receive a first signal having a first frequency and a second signal having a second frequency, and to output a third signal which is a function of the first and second signals. The amplifier module includes a first amplifier stage and a second amplifier stage and is configured to amplify a communications signal which is then input into the mixer as the first signal. The first and second amplifier stages are in communication via a first signal path and a second signal path. The interface circuit is interposed between the mixer and the amplifier module, and inserted into the second signal path so that a DC bias current flows from the first amplifier stage through the interface module into the second amplifier stage.

59 Claims, 7 Drawing Sheets

APPARATUS AND METHOD FOR IMPLEMENTING A LOW-NOISE AMPLIFIER AND MIXER

FIELD OF THE INVENTION

The invention relates to a low-noise amplifier circuit and mixer. More particularly, the invention relates to a circuitry for a radio frequency receiver of a cellular phone.

BACKGROUND OF THE INVENTION

A typical receiver for a radio frequency signal (RF signal) comprises a combination of an amplifier and a mixer for signal amplification and frequency conversion. The amplifier, usually a low-noise amplifier (LNA), receives the RF signal, amplifies the RF signal and feeds the amplified RF signal to the mixer which in addition receives a local signal from a local oscillator (LO). The local oscillator signal has a frequency which is different from the frequency of the RF signal. The mixer, which is a nonlinear device, generates an output signal that includes more frequencies than the frequencies of the RF signal and the local signal. The output signal is usually filtered to block undesired frequencies which include the original frequencies, their harmonics and their sum frequencies.

The amplifier and mixer used in such a receiver should ideally exhibit several desired parameters and characteristics which are usually used to describe the performance of the amplifier and the mixer. For example, an amplifier should exhibit a high power gain, a low noise figure and the capability of handling large input signals without intermodulation distortion (IMD). The power gain is defined as the ratio of the signal power at the output port to the signal power at the input port. The noise figure is defined as the ratio of the signal-to-noise ratio (SNR) at the input port to the signal-to-noise ratio at the output port.

The intermodulation distortion refers to undesired frequency components which are caused when a signal having two or more sinusoidal frequencies $f_1$, $f_2$ is applied to a nonlinear amplifier. The output signal of such an amplifier contains the additional undesired frequency components called intermodulation products. The output signal will contain, for example, frequency components at DC, $f_1$, $f_2$, $2f_1$, $2f_2$, $3f_1$, $3f_2$, $f_1+/-f_2$, $2f_1+/-f_2$ and $2f_2+/-f_1$. The frequencies $2f_1$ and $2f_2$ are the second harmonics, $3f_1$ and $3f_2$ are the third harmonics, $f_1+/-f_2$ are the second-order intermodulation products (the sum is 2), and $2f_1+/-f_2$ and $2f_2+/-f_1$ are the third-order intermodulation products (the sum is 3). The third-order intermodulation products are close to the fundamental frequencies $f_1$ and $f_2$ and fall within a bandwidth in which the amplifier amplifies, producing distortion in the output signal.

A parameter to evaluate the third-order intermodulation products is the so-called third-order intercept point (IP3). This point is defined by means of a graphical analysis using the output power of the third-order intermodulation product as a function of the input power and the output power of the fundamental component at fl as a function of the input power. The intercept point is defined as the point at which the two (linearized) graphs intercept. The higher the intercept point, the better the suppression of the third-order intermodulation product and the less disturbed is the output signal of the amplifier.

The mixer should exhibit, inter alia, a high conversion gain, a low noise figure and also a high third-order intercept point (IP3). The conversion gain is defined as the ratio of the output power of the IF signal to the input power of the RF signal.

The combination of the LNA amplifier and the mixer is configurable to operate in receivers which are adapted for various applications. For example, the combination can be used in TV receivers or in phones for a radio communications system. One example of a radio communications systems is a cellular system that is in accordance with a particular standard, such as "Global System for Mobile Communications" (GSM), "Advanced Mobile Phone System" (AMPS) or "Code Division Multiple Access" (CDMA).

These standards have different requirements and specifications for the combination of the LNA amplifier and the mixer, for example, with respect to linearity, noise figure and intermodulation distortions. Particularly the CDMA standard requires that the LNA amplifiers and mixers in CDMA phones have simultaneously both a high IP3 and a low noise figure.

To achieve this combination of difficult specifications, current solutions implement circuit architectures, including RF transistors (SFET, HBT), in gallium arsenide (GaAs) technology. Processes to manufacture the circuits and the RF transistors in GaAs technology, however, are expensive compared to processes in silicon technology.

SUMMARY OF THE INVENTION

There is, therefore, a need to provide an LNA amplifier and a mixer which fulfill the specifications, for example, defined for hand-held communications devices, and can be implemented in low-cost silicon technology.

An aspect of the invention relates to a hand-held communications device, for example, a cellular phone or a wireless phone. The hand-held communications device includes a mixer, an amplifier module and an interface circuit. The mixer is configured to receive a first signal having a first frequency and a second signal having a second frequency, and to output a third signal which is a function of the first and second signals. The amplifier module includes a first amplifier stage and a second amplifier stage and is configured to amplify a communications signal which is then input into the mixer as the first signal. The first and second amplifier stages are in communication via a first signal path and a second signal path. The interface circuit is interposed between the mixer and the amplifier module, and inserted into the second signal path so that a direct current (DC) bias current flows from the first amplifier stage through the interface module into the second amplifier stage.

A further aspect of the invention relates to an apparatus for generating an intermediate signal. The apparatus includes a mixer, a circuit module and an interface circuit. The mixer is configured to receive a first signal having a first frequency and a second signal having a second frequency, and to output a third signal which is a function of the first and second signals. The circuit module includes a first circuit stage and a second circuit stage and is configured to modify a communications signal which is input into the mixer as the first signal. The first and second circuits are in communication via a first signal path and a second signal path. The interface circuit is interposed between the mixer and the circuit module, and inserted into the second signal path so that a bias current flows between the first circuit and the second circuit via the interface module.

An other aspect of the invention relates to an apparatus for amplifying an electrical signal. The apparatus includes an amplifier module, and an interface circuit. The amplifier module comprises a first amplifier stage and a second amplifier stage and is configured to amplify the electrical signal. The first and second amplifier stages are in communication via a first signal path and a second signal path. The interface circuit is interposed into the second signal path so that a bias current flows between the first amplifier stage and the interface circuit via the second amplifier stage, whereas the second signal path conveys the radio frequency signal.

A further aspect of the invention relates to an apparatus for amplifying an electrical signal. The apparatus comprises means for amplifying the electrical signal, and means for interfacing. The amplifying means comprise a first and a second means for amplifying the electrical signal. The first and second amplifying means are in communication via a first signal path and a second signal path. The means for interfacing are interposed into the second signal path so that a bias current flows between the first amplifying means and the interfacing means via the second amplifying means, whereas the second signal path conveys the radio frequency signal.

Another aspect of the invention relates to a method for generating an intermediate signal. In an apparatus which includes a mixer, a circuit module which comprises a first circuit and a second circuit, and an interface circuit, the interface circuit interposed between the mixer and the circuit module, the first and second circuits are operated so that a current flows between the first and second circuits via the interface circuit. A first signal is modified with the first circuit and fed to the to the second circuit. The modified first signal is modified with the second circuit to generate a second signal. A third signal is generated which is dependent from the second signal. The third signal and a fourth signal are mixed with the mixer to generate the intermediate signal.

A further aspect of the invention relates to a method for amplifying an electrical signal. The method includes interconnecting a first amplifier stage, an interface circuit, and a second amplifier stage. A bias current is conveyed through the interface circuit, and a radio signal is conveyed through the interface circuit.

BRIEF DESCRIPTION OF THE DRAWINGS

These and other aspects, advantages, and novel features of the invention will become apparent upon reading the following detailed description and upon reference to the accompanying drawings.

DETAILED DESCRIPTION

An embodiment of the present circuitry which comprises an amplifier circuit and a mixer is described with reference, but not limited to a radio communications system. It is contemplated that the invention is applicable in any system which requires amplification and mixing of radio frequency signals in accordance with strict requirements, for example, regarding power gain, noise figure and third-order intermodulation intercept point (IP3) which are hereinafter used as exemplary parameters for evaluating the performance of the circuitry. In one embodiment, the circuitry is part of an RF receiver for a cellular phone. The following description of an embodiment of the combination and its application is therefore referenced to the particulars of a cellular phone system (for example, GSM, CDMA, AMPS) and cellular phones.

Figure 1A:
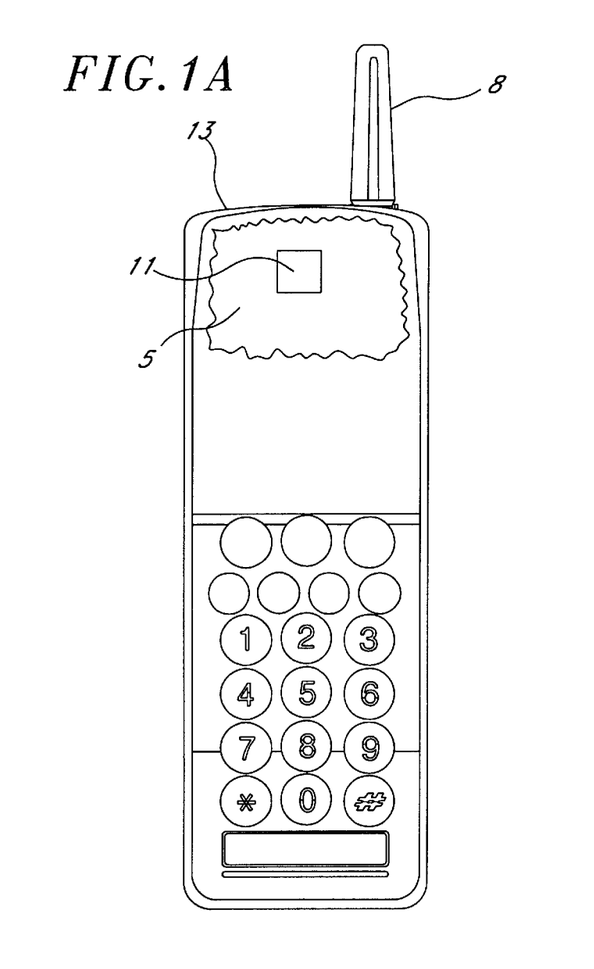
FIG. 1A is a schematic illustration of a cellular phone.

FIG. 1A schematically illustrates a cellular phone 13 including an antenna 8 a display and a keypad. A portion of the case of the cellular phone 13 is cut away to show a motherboard 5 of the cellular phone 13 with an integrated circuit 11 which includes a portion of an RF receiver as described below. Although not shown in FIG. 1A, those skilled in the art will appreciate that the cellular phone 13 comprises a plurality of other components and functional modules.

Figure 1B:
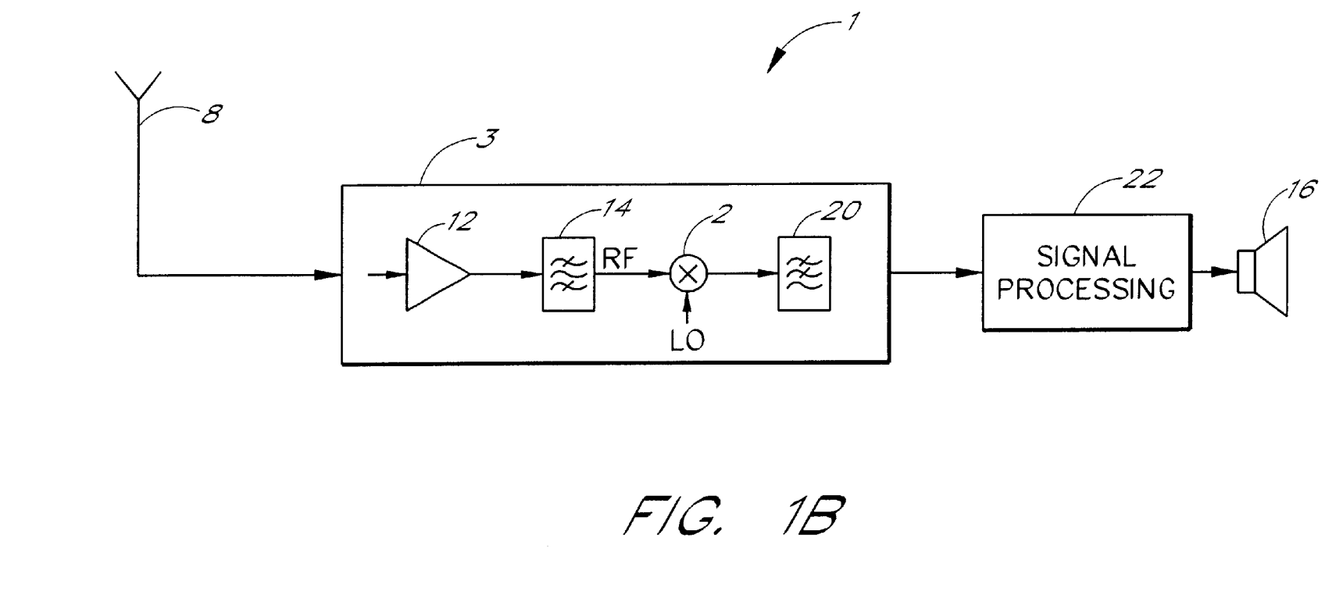
FIG. 1B is a schematic illustration of a typical receiver, for example, for use in a cellular phone.

A typical RF receiver requires several groups of amplifiers separated by frequency-changing circuits (e.g., mixers) to extract information carried by a weak signal voltage that appears at terminals of an antenna. FIG. 1B shows an illustration of a portion of a typical RF receiver 1 which is, for example, included in an RF portion of the cellular phone 13 shown in FIG. 1A. In the shown conceptional embodiment, the RF receiver 1 comprises the antenna 8 and an amplifier and mixer module 3 which is connected to the antenna 8 and to a signal processing module 22. The signal processing module 22 is connected to a loudspeaker 16. The module 3 comprises an LNA amplifier 12, a mixer 2 and filters 14, 20. The filter 14 is a band pass filter and interposed between the LNA amplifier 12 and an input for an RF signal of the mixer 2. The mixer 2 has a further input for a signal LO which is generated by a local oscillator (not shown) in a conventional manner. An output of the mixer 2 is connected to the filter 20 which is a low pass filter. In another embodiment, the filter 20 can be a bandpass filter. Hereinafter, the filter 20 is a low pass filter.

The module 3 receives an RF signal from the antenna 8 and amplifies it with the LNA amplifier 12. The amplified RF signal is filtered by the band pass filter 14 to select a specific frequency band and to limit the bandwidth of the RF signal. The mixer 2 receives the signal LO and the RF signal and generates an output signal comprising the fundamental frequencies of the RF signal and the signal LO, harmonics thereof, and intermodulation products. The low pass filter 20 selects a desired intermediate frequency (IF) and blocks undesired frequencies. The generated signal having the intermediate frequency is input to the signal processing module 22 which performs, for example, demultiplexing and decoding. After this processing, the loudspeaker 16 reproduces information conveyed by the RF signal.

In an exemplary cellular phone system, the RF signal has a carrier frequency of about 800 MHz or about 900 MHz depending on national particularities. The RF signal originates from a remote radio transmitter (base station transmitter) which modulates, for example, a 900 MHz signal with a data and/or voice signal. The signal LO generated by the local oscillator is a sinusoidal signal having a frequency between 930 MHz and 1200 MHz or between 500 MHz and 750 MHz. In one embodiment, the signal LO has a frequency of about 1 GHz. The mixer outputs a signal which has the desired intermediate frequency in the range of about 50 MHz to 300 MHz (difference between the frequency of the signal LO and the carrier frequency of the RF signal). Other cellular phone systems operate, for example, at carrier frequencies of about 1800 MHz or 1900 MHz. The frequency of the signal LO in these cellular phone systems is then selected to generate a similar range for the intermediate frequency. The embodiment of the present invention is hereinafter described with reference to a 900 MHz cellular phone system. However, it is contemplated that the present invention is also applicable in cellular phone systems operating at other carrier frequencies such as 800 MHz, 1800 MHz or 1900 MHz.

Figure 1C:
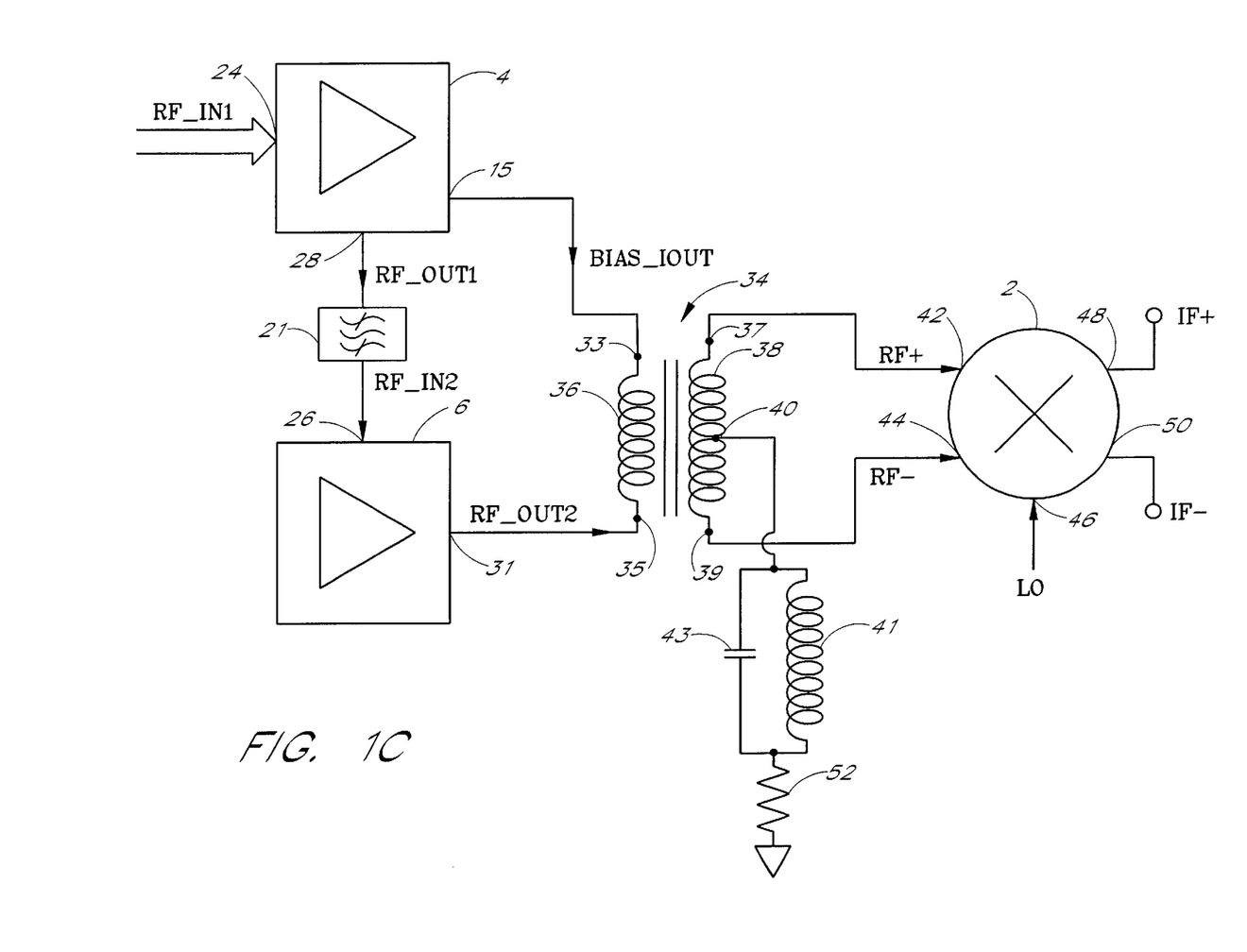
FIG. 1C is a schematic illustration of an amplifier and mixer portion of the receiver shown in FIG. 1B.

FIG. 1C is a schematic illustration of a portion of the RF receiver 1 shown in FIG. 1B. The portion includes the mixer 2, an amplifier arrangement formed by an LNA amplifier 4 and a drive amplifier 6, and an interface circuit, which is in a preferred embodiment a transformer 34. The amplifier arrangement comprising the LNA amplifier 4 and the drive amplifier 6 corresponds to the LNA amplifier 12 shown in the conceptional embodiment of FIG. 1B. It is contemplated that the shown grouping into functional blocks serves to ease the illustration of the portion of the RF receiver 1 and not is not intended to limit the description to the illustrated embodiment. Those skilled in the art will appreciate that such a grouping is random and that other groupings or no grouping at all are possible. For example, components of the LNA amplifier 4 can be assigned to the drive amplifier 6 and vice versa, without changing the principal operation of the circuitry.

In one embodiment, the circuitry shown in FIG. 1C is designed to be manufactured and implemented with processes based on silicon technology which are less expensive than processes in GaAs technology. It is contemplated that the circuitry, all or only a part of the circuitry, is preferably implemented as an integrated circuit (IC) on a silicon wafer comprising a plurality of chips. Each chip comprising the integrated circuit is then mounted to a support. The support has a plurality of planar lines which are connected to pins. Each chip has contact pads which are connected to the lines by means of bond wires. The mounted and bonded chip is then sealed with a plastic composition, as it is known in the art, to form a package, for example, a dual-in package (DIP). Alternatively, the pads of the chip can be arranged in such a way so that the pads can be soldered to the lines to avoid bond wires. To implement any necessary inductors, internal or external inductors can be used. Depending on how much of the circuitry is integrated on a chip, more or less external components need to be connected to the package, to fulfill the specific parameters.

The circuitry is designed and implemented under consideration of rules known in the field of design of high frequency/radio frequency circuits. Those skilled in the art will appreciate that the circuitry can be realized with discrete components or as a hybrid module under consideration of these rules, although an integrated circuit is the preferred implementation. The use of a standard silicon bipolar process allows that the circuitry can be integrated with a high level of integration. Advantageously, the circuitry has a low power consumption.

In the illustrated embodiment, the LNA amplifier 4 has an input 24 for an RF signal RF_IN1 which originates from the antenna 8 shown in FIG. 1B. The LNA amplifier 4 further has an output 28 for an RF signal RF_OUT1 and an output 15 for a signal BIAS_IOUT. The output 28 is connected to a filter 21 having a filter characteristic selected to block undesired frequency components. In one embodiment, the filter 21 is a conventional band pass filter of a desired order having, for example, an upper cut-off frequency of about 895 MHz and a lower cut-off frequency of about 860 MHz. The upper and lower cut-off frequencies define a receive band for the RF receiver 1.

Figure 3:
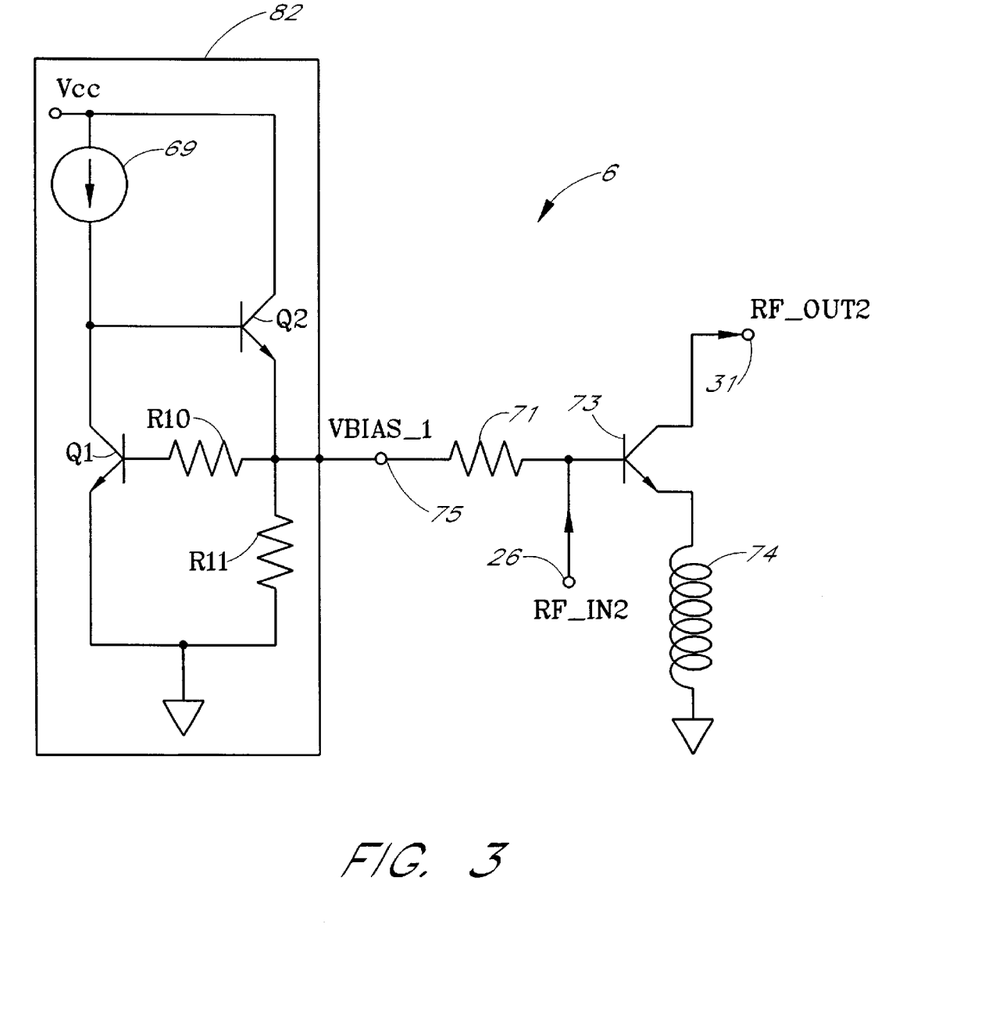
FIG. 3 is a schematic illustration of a first amplifier of the amplifier portion.
Figure 4:
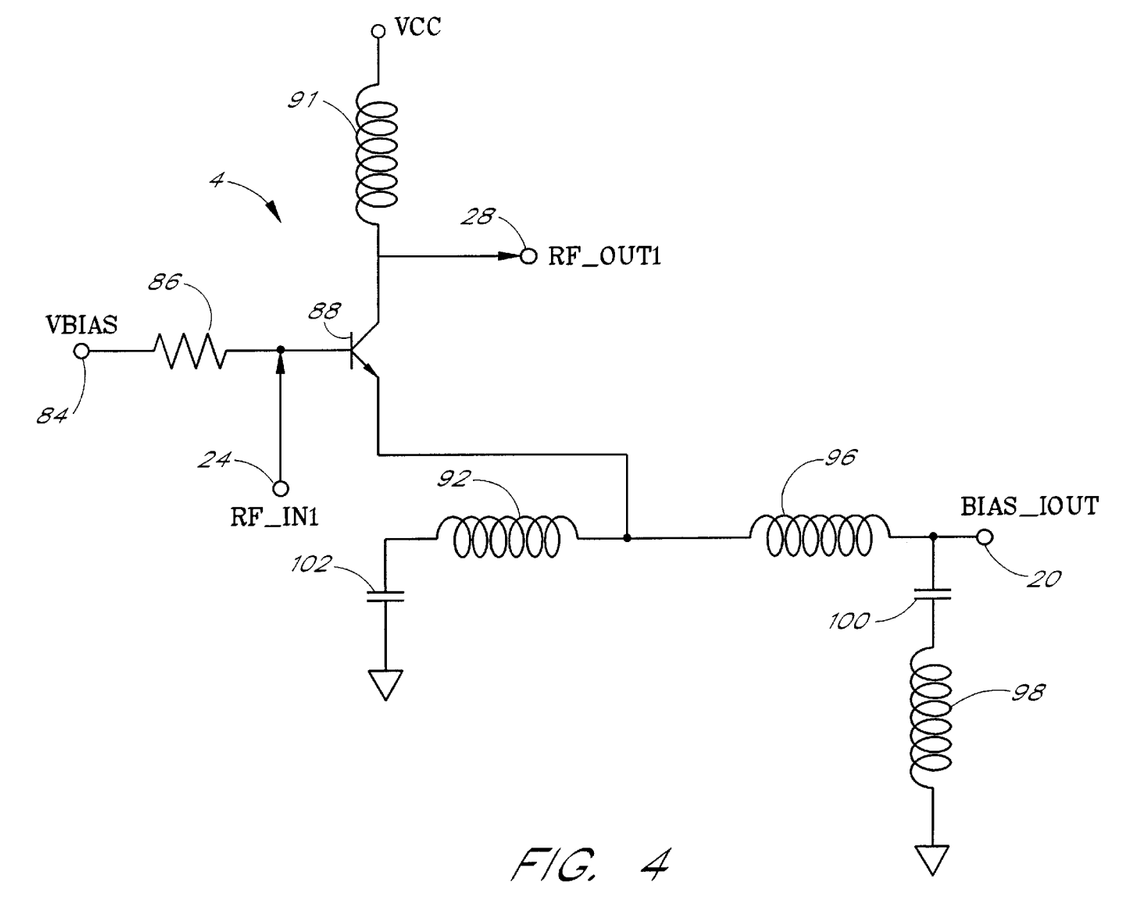
FIG. 4 is a schematic illustration of a second amplifier of the amplifier portion.

The filter 21 receives the RF signal RF_OUT1 and outputs an RF signal RF_IN2. The drive amplifier 6 has an input 26, connected to the filter 21, for the RF signal RF_IN2 and an output 31 for an RF signal RF_OUT2. Both, the LNA amplifier 4 and the drive amplifier 6 are connected to a power supply (not shown) and circuitry which, inter alia, allows biasing the amplifiers 4, 6 to set a desired operational mode. An embodiment of the drive amplifier 6 is shown in FIG. 3 and an embodiment of the LNA amplifier is shown in FIG. 4.

The signal RF_IN1 has, for example, a carrier frequency of about 900 MHz. The LNA amplifier 4 is configured to amplify RF signals in this 900 MHz frequency range, i.e., the signal RF_OUT1 is the amplified signal RF_IN1 and has the same carrier frequency of about 900 MHz. The filter 21 blocks frequencies of the signal RF_OUT1 which are outside the pass band between the upper and lower cut-off frequencies so that the signal RF_IN2 (900 MHz) corresponds to the signal RF_OUT1, but is limited in bandwidth.

The transformer 34 has a first winding 36 with terminals 33, 35 and a second winding 38 with terminals 37, 39, 40. The terminal 33 is connected to the output 15 of the LNA amplifier 4 and the terminal 35 is connected to the output 31 of the drive amplifier 6. The terminal 37 is connected to an input 42 of the mixer 2 and the terminal 39 is connected to an input 44 of the mixer 2. The second winding 38 of the transformer 34 has the terminal 40 which is a (center) tap grounded via a resonant circuit and a resistor 52. The resonant circuit includes a parallel arrangement of an inductor 41 and a capacitor 43. The resonant circuit is connected to the terminal 40 and the resistor 52 which is grounded. The terminal 40 is a reference to ground for the signal portions RF+ and RF−.

In one embodiment, the transformer 34 is integrated on the chip together with other components of the circuitry. The primary and secondary windings 36, 38 are realized in metal layers (e.g., three metal layers) of the chip as it is known in the art. The transformer 34 is implemented to have a high coupling efficiency, preferable higher than 0.8 between the primary and secondary windings 36, 38. The primary and secondary windings 36, 38 both have preferably more than one turn. In the illustrated embodiment, the transformer 34 is a balanced transformer having, for example, a transformation ratio of 1:1. It is contemplated that the transformer 34 can have other transformation ratios.

As indicated in FIG. 1C, the signal BIAS_IOUT flows from the LNA amplifier 4 through the winding 36 into the drive amplifier 6. The signal BIAS_IOUT is a DC bias current of, for example, about 10–12 milliamperes (mA). In one embodiment, the DC bias current is 10 mA which is mainly determined by the drive amplifier 6. The signal BIAS_IOUT flows through the LNA amplifier 4 and through the drive amplifier 6. The DC bias current is therefore "re-used" in the drive amplifier 4. The illustrated architecture, which allows such "re-using" of the DC bias current: provides for fulfilling the circuit requirements of having simultaneously both a high IP3, a low noise figure, and a low power consumption.

The drive amplifier 6 is a single-ended gain stage coupled to the mixer 2 via the transformer 34 which allows the achievement of a lower noise figure. The transformer converts the single-ended RF signal into a differential signal which helps to suppress even-order signal distortions.

The LNA amplifier 4, the drive amplifier 6 and the transformer 34 can be implemented as an individual IC component. The IC component is then connectable to mixers selected for specific applications providing application and design flexibility.

In an embodiment, the mixer 2 is a differential mixer and receives a differential RF signal having a "positive" signal portion RF+ and a "negative" signal portion RF− from the transformer 34. The mixer input 42 receives the positive signal portion RF+ and the mixer input 44 receives the negative signal portion RF−. A signal LO generated by a local oscillator is received at an input 46 of the mixer 2. The mixer 2 has two outputs 48, 50 for a differential intermediate frequency signal having a "positive" signal portion IF+ and a "negative" signal portion IF−. An embodiment of the mixer 2 is shown in greater detail in FIG. 2.

Figure 2:
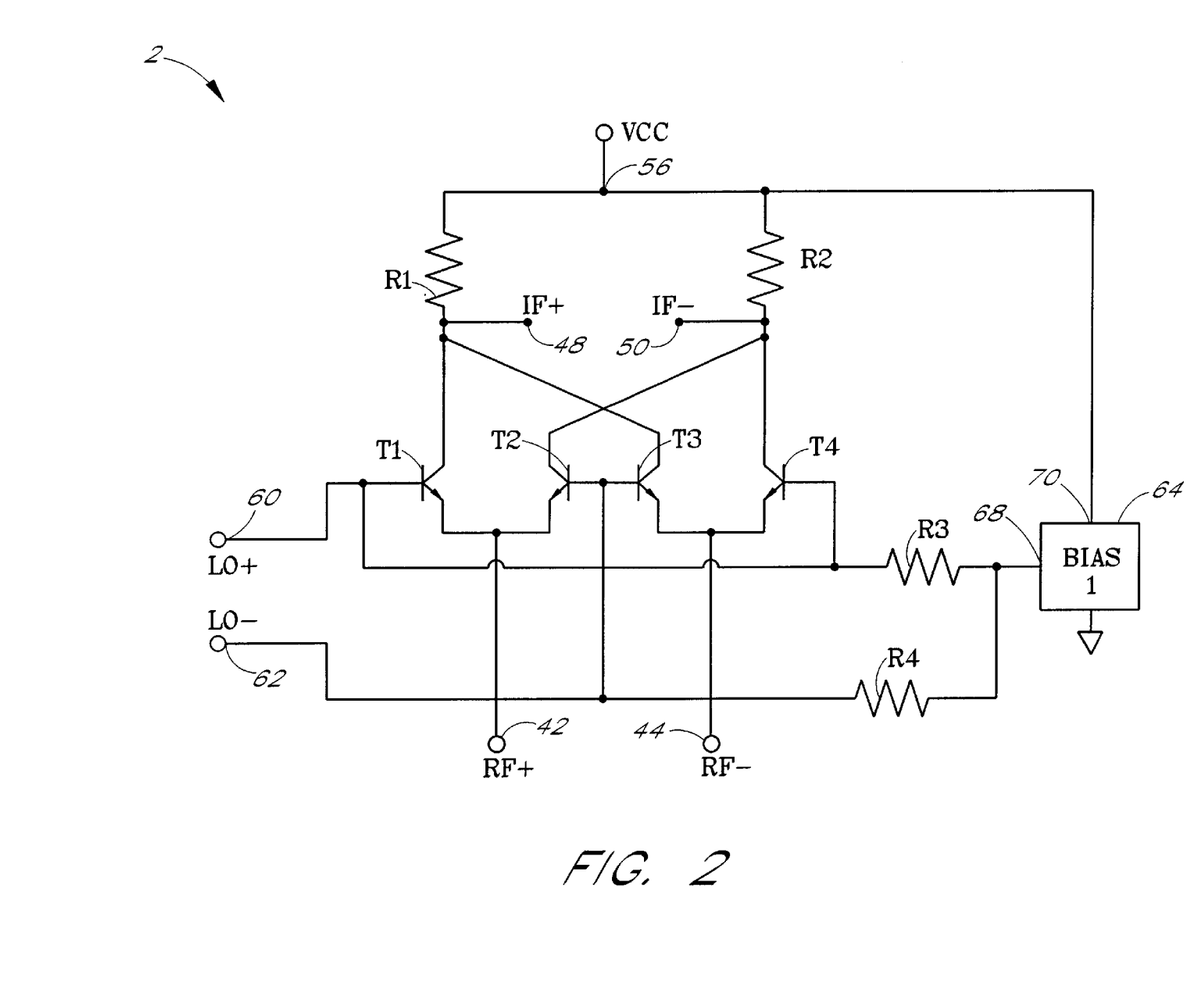
FIG. 2 is a schematic illustration of a first embodiment of the mixer.

FIG. 2 is a schematic illustration of a first embodiment of the mixer 2. The mixer 2 comprises a bias circuit 64 and four transistors T1, T2, T3, T4 each having a base, an emitter and a collector. The transistors T1–T4 form the core of the mixer 2 which is known as a Gilbert mixer and described, for example, in Paul Grey and Robert Meyer, "Analysis and Design of Analog Integrated Circuits", John Wiley & Son, pages 593–605, ISBN 0-471-87493-0.

The emitters of the transistors T1, T2 are interconnected and both connected to the input 42 for the signal portion RF+. The emitters of the transistors T3, T4 are interconnected and both connected to the input 44 for the signal portion RF−. The collectors of the transistors T1, T3 are interconnected and both connected to a resistor R1, which is also connected to a port 56 for a power supply VCC, and to the output 48 for the signal IF+. The collectors of the transistors T2, T4 are interconnected and both connected to a resistor R2, which is also connected to the port 56, and to the output 50 for the signal IF−. The bases of the transistors T1, T4 are interconnected; both bases are connected to a port 60 and to a resistor R3 which is also connected to a port 68 of the bias circuit 64. The port 60 receives a "positive" signal LO+ derived from the local oscillator. The bases of the transistors T2, T3 are interconnected; both bases are connected to a port 62 and to a resistor R4 which is also connected to the port 68 of the bias circuit 64. The port 62 receives a "negative" signal LO− derived from the local oscillator. The bias circuit 64 has a port 70 which is connected to the power supply port 56.

The transistors T1–T4, as well as other transistors described hereinafter, are advantageously npn bipolar junction transistors (BJT) implemented in silicon technology. The transistors T1–T4 are configured to mix signals having frequencies in the range between 900 MHz and 1200 MHz. It is contemplated that other types of transistors, such as npn or pnp hetero bipolar transistors (HBT) or field effect transistors (FET) can be used in the embodiments of the circuitry.

In the illustrated embodiment of the mixer 2, the resistors R1, R2 have approximately 500 ohms each, and the resistors R3, R4 have approximately 1 kiloohm each. The power supply is typically a voltage source that provides a voltage of about 5 volts. It is contemplated that the voltage may vary depending on the particulars of the technology used to implement the mixer 2.

The mixer 2 is a double-balanced mixer which has both the signals RF+, RF− and the signals LO+, LO− applied to separate inputs 42, 44 and ports 60, 62 in push-pull fashion. The mixer 2 is therefore configured so that the signals LO+, LO− do not appear at the inputs 42, 44 and the outputs 48, 50. The signals LO+, LO− control the on-off cycles of the transistors T1–T4. For instance, when the transistor T1 is on, the input 42 is connected to the output 48, and when the transistor T3 is on, the input 44 is connected to the output 48. Similar on-off cycles exist for the transistors T2, T4.

Each transistor T1–T4 mixes a signal RF+, RF− having a frequency $f_1$, with a signal LO+, LO− having a frequency $f_2$ generating an output signal IF.

The signal LO (applied between LO+ and LO−) causes the transistors T1–T4. to act as switches, effectively multiplying a unit square wave at the LO frequency by the input signal.

The signal LO can be written as a fourier series:

$$V_{LO} = \frac{4}{\pi}\left[\sin(\omega_{LO}t) + \frac{1}{5}\sin(5\omega_{LO}t) + \ldots\right].$$

The input can be written:

$$V_{si}(t) = V_a \sin(\omega_i t).$$

Multiplying $V_{LO}$ and $V_i$ and a scale factor representing the mixer's gain, the output signal is:

$$V_{if}(t) = A * V_a * \frac{4}{\pi}\left[\sin(\omega_{LO}t)\sin(\omega_i t) - \frac{1}{3}\sin(3\omega_{LO}t)\sin(\omega_i t) + \ldots\right].$$

The first term gives the desired output:

$$\sin(\omega_{LO}t)\sin(\omega_i t) = \frac{1}{2}[\cos[(\omega_{LO} - \omega_i)t] - \cos[(\omega_{LO} + \omega_i)t]].$$

Filtering removes the unwanted signals (frequencies) resulting in the desired (frequency translated) output, wherein $A*2/\pi$ is the total gain of the mixer 2:

$$V_{IF}(t) = AV_a\frac{2}{\pi}\cos[(\omega_L - \omega_i)t].$$

When the mixer 2 is used in an RF receiver, only the absolute value of the difference frequency $f_1-f_2$ is required. That is, the original frequencies $f_1$, $f_2$, their harmonics $2f_1$, $2f_2$, $3f_1$, $3f_2$, and their sums, for example, $f_1+f_2$, are removed by filt or other means. Further details regarding mixing are described in a book by Herbert L. Krauss, et al., "Solid State Radio Engineering", chapter 7, 1980, John Wiley & Son, ISBN 0-471-03018.

The mixer 2, in combination with the drive amplifier 6, has a conversion gain of about 15 dB which is sufficiently high to fulfill the requirements discussed above. Advantageously, the mixer 2 suppresses the signal LO from interfering with the signal IF, and suppresses the signal RF from interfering with the signal IF. The mixer 2 can be implemented in a flexible manner as a differential output mixer 2 or as a single-ended output mixer 2' as shown in FIG. 5.

Figure 5:
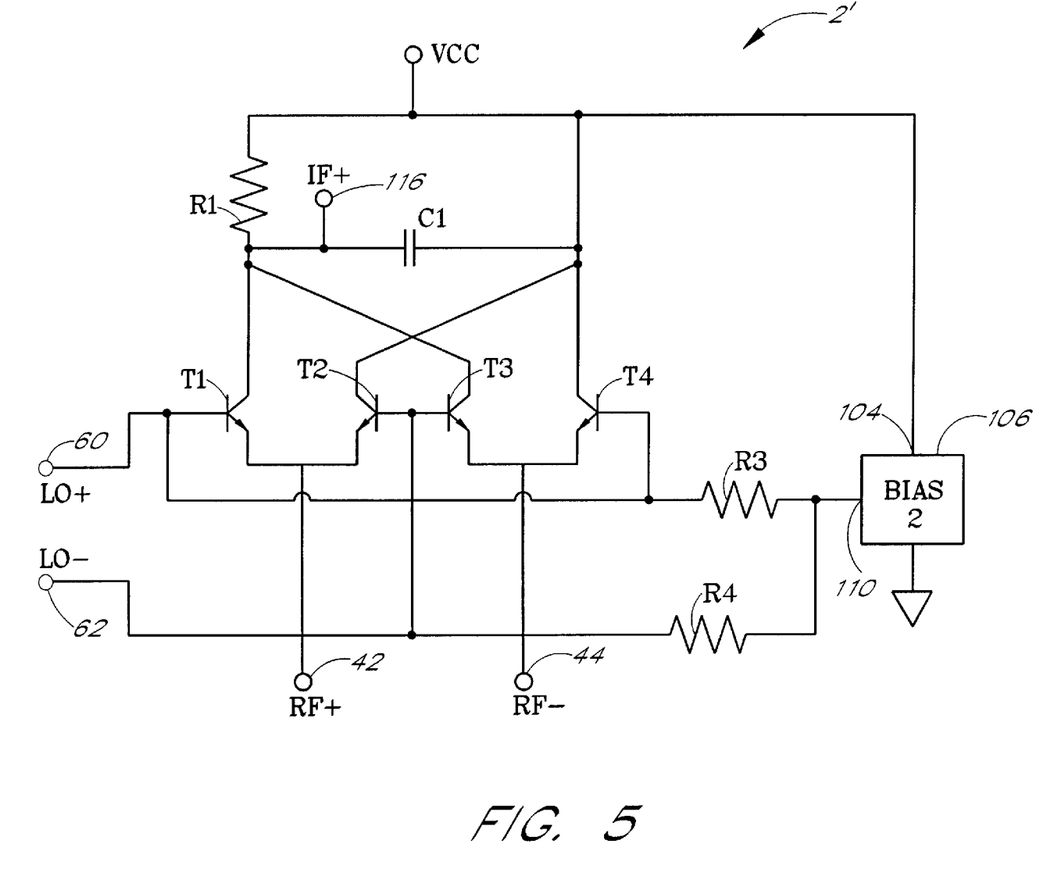
FIG. 5 is a schematic illustration of a second embodiment of the mixer.

The resonant circuit formed by the inductor 41 and the capacitor 43 is connected to the terminal 40 of the transformer 34 to improve the noise figure of the mixer 2 in the case of a single-ended output of the mixer 2' (FIG. 5). The inductor 41 allows the DC current to flow through it without disturbing the DC biasing. The resonant circuit resonates at a frequency $$f_{res} = \frac{1}{2\pi\sqrt{LC}}$$

providing a high impedance at and near the resonant frequency for current flowing out of the terminal 40 of the transformer 34. This high impedance lowers the gain at the IF frequency of a parasitic gain path that allows inherent thermal noise from the biasing circuits to reach the output 116 (FIG. 5). Reducing the amount of thermal noise that reaches the output reduces the noise figure of the circuit.

The bias circuit 64 outputs a DC bias voltage at the port 68 which is connected to the resistors R3, R4. The resistors R3, R4 determine the impedance across the ports 60, 62, while not substantially altering the bias current through the transistors T1–T4. The (collector) current through the transistors T1–T4 is set by the DC bias voltage at port 68. The transistors T1–T4 have a current amplification β of about 100 and a base-emitter voltage of about 0.8 volts. In one embodiment, the collector current is about 10 mA, the resistors R3, R4 have a value of about 1 kiloohm each, and the resistor 52 has a value of about 15 ohms.

FIG. 3 is a schematic illustration of the drive amplifier 6 shown in FIG. 1C. The drive amplifier comprises a transistor 73 having a base, an emitter and a collector. The base of the transistor 73 is connected to the port 26, which receives the signal RF_IN2, and to a resistor 71, which receives a signal VBIAS_1 from a port 75. The signal VBIAS_1 is generated by a voltage source 82 connected to the port 75. It is contemplated that the voltage source 82 can be included in the drive amplifier 6 or an external component configured to be connected to the drive amplifier 6. For instance, voltages sources are described in Paul Grey and Robert Meyer, "Analysis and Design of Analog Integrated Circuits", John Wiley & Son, pages 233–237, ISBN 0-471-87493-0.

The emitter of the transistor 73 is grounded via an inductor 74 and the collector is connected to the output 31 for the signal RF_OUT2. The transistor 73 is an npn bipolar junction transistor as discussed above. The inductor 74 has an inductance of about 4 nanoHenries (nH) and the resistor 71 has a value of about 2 kiloohms. The signal VBIAS_1 is a DC voltage of about 0.8 volts which biases the transistor 73.

In one embodiment, the voltage source 82 comprises transistors Q1, Q2, resistors R10, R11 and a current source 69 which is connected to a supply voltage VCC. The base of the transistor Q1 is connected to the resistor R10 and the emitter is connected to ground. The collector of the transistor Q1 is connected to the current source 69 and to the base of the transistor Q2. The emitter of the transistor Q2 is connected to the resistor R10, to the port 75 and to the resistor R11 which is grounded. The collector of the transistor Q2 is connected to the supply voltage VCC.

The current source 69 is adapted to the drive amplifier 6. That is, the transistor 73 has a size which is about twenty times larger than the size of the transistor Q1, and the resistor R10 has a value which is about twenty times the value of the resistor 71. The ration between the transistors Q1 and Q73, and the ratio between the resistors R10, R71, ensure that the collector current of the transistor 73 is about twenty times the current output from the current source 69. Advantageously, this combination further provides for a compensation of any deviations in the current caused by varying temperature.

In one embodiment, the current source 69 provides a constant current of about 0.5 mA and the resistor R10 has a value of about 20 kiloohms. That is, the collector current (the signal BIAS_IOUT) of the transistor 73 is about 10 mA.

The drive amplifier 6 receives the signal RF_IN2 and outputs the signal RF_OUT2. The drive amplifier 6 has a transimpedance of about 40 millisiemens at the frequency of the signal RF_IN2 (e.g., 900 MHz). The inductor 74 serves to linearize the drive amplifier 6. In an embodiment of the drive amplifier 6, the inductor 74 is a combination of a bond wire and a package pin having a total inductance of about 4 nH at 900 MHz. The bond wire connects the emitter of the transistor 73 to the (external) pin of the package. This pin is then connected to ground. As discussed above, the connection of the emitter to the external pin can also be via lines and internal or external inductors. To achieve a higher inductance and, thus, a higher linearity an external inductor may be connected to the external pin.

FIG. 4 is a schematic illustration of the LNA amplifier 4 shown in FIG. 1C. In the illustrated embodiment, the LNA amplifier 4 comprises a transistor 88, a resistor 86 and several inductors 91, 92, 96, 98 and capacitors 100, 102. The base of the transistor 88 is connected to the resistor 86 and to the input 24 which receives the signal RF_IN1. The resistor 86 is further connected to a port 84 which receives a bias signal VBIAS. The collector of the transistor 88 is connected to the output 28 for the signal RF_OUT1, and to the inductor 91 which is connected to the power supply VCC. The emitter of the transistor 88 is connected to the inductor 92 which is serially connected to the grounded capacitor 102. The emitter is further connected to the inductor 96 which is connected to the output 15 for the signal BIAS_1OUT, and to serial arrangement of the capacitor 100 and the inductor 98 which is grounded.

The signal VBIAS is a DC voltage of about 1.8 volts which biases the transistor 88. A DC path exists from the power supply VCC to the output 15 via the transistor 88 and the inductors 91, 96. As shown in FIG. 1C, the output 15 is connected to the winding 36 of the transformer 34 allowing the reuse of the DC current from the LNA amplifier 4 in the drive amplifier 6. This reuse of the DC current allows to save power consumed by the LNA amplifier 4 and mixer 2. The serial inductor/capacitor arrangement 92, 102 and the serial inductor/capacitor arrangement 100, 98 provide for a good connection to ground for AC signals. The inductor 96 blocks RF signals from leaking from the transistor 88 to the transformer 34 and to the mixer 2, and from leaking from the transformer 34 and the mixer 2 to the transistor 88.

In one embodiment of the LNA amplifier 4, the resistor 86 has a value of about 1 kiloohm and the capacitors 100, 102 have values of about 33 picofarads (pF). The capacitor 100 is integrated on the chip, whereas the capacitor 102 is not integrated on the chip. The inductor 92 is a combination of a bond wire and a package pin having a total inductance of about 4 nH at 900 MHz. As discussed above, the bond wire connects the emitter of the transistor 88 to the pin of the package to which the external capacitor 102 is connected. Alternatively, the emitter can be connected to the pin via a line in combination with an internal or external inductor as discussed above. The inductor 96 is integrated on the chip and has an inductance of about 12 nH at 900 MHz. The inductor 98 is a bond wire having an inductance of about 0.5 nH at 900 MHz. It is contemplated that each one of the inductors 91, 92, 96, 98 can be implemented by a serial arrangement of two or more individual inductors to achieve specific desired values and/or to fulfill specific RF design rules. For instance, the integrated inductor 96 can be implemented by a serial arrangement of two inductors of about 11 nH and 1 nH. As the transistors T1–T4, 73, the transistor 88 is an npn bipolar junction transistor as discussed above.

FIG. 5 is a schematic illustration of a second embodiment of a mixer 2' as used in an RF receiver, for example, within a cellular phone. The mixer 2' has a structure that is similar to the structure of the mixer 2 shown in FIG. 2. Thus, same components have the same reference numerals. Unlike the mixer 2 which outputs a differential intermediate signal IF+, IF−, the mixer 2' is configured to output a single-ended intermediate signal IF at an output 116. The transistors T1–T4, the resistors R1, R3, R4 are arranged as described in connection with FIG. 2 and similarly connected to the inputs 42, 44 and the ports 60, 62 which receive the signals RF+, RF−, LO+, LO−, respectively. The mixer 2' also comprises a bias circuit 106 having a port 110 which is connected to the resistors R3, R4, and a port 104 connected to the power supply VCC. In this embodiment, the resistors R1, R3, R4 have values of about 1 kiloohm each.

The following description refers to the FIGS. 1C–4. The LNA amplifier 4. and the drive amplifier 6 form two common-emitter (CE) gain stages which share the same bias current (BIAS_IOUT). That is, the emitter is always operated at ground potential with respect to the signal. A CE gain stage is characterized by a moderately high input impedance and a high output impedance, where the input impedance is the impedance seen from the input terminals (base, emitter) and the output impedance is the impedance seen from the output terminals (collector, emitter).

The LNA amplifier 4 and the drive amplifier 6 are configured so that when the signal VBIAS is about 1.8 volts, the voltage across the collector-emitter of the transistor 88 is higher than the voltage across the collector-emitter of the transistor 73. In one embodiment, with a supply voltage of about 5 volts, the voltage across the transistor 88 is about 4 volts and the voltage across the transistor 73 is about 1 volt. In this embodiment, the DC bias current is about 10 mA. The higher voltage across the collector-emitter of the transistor 88 allows to fulfill the requirements of a high IP3 and a low noise figure.

The drive amplifier 6 is a gain stage for the mixer 2. Because the collector of the transistor 73 "sees" a low impedance of the mixer 2 via the transformer 34, the drive amplifier 6 can achieve a high IP3 without a high voltage across the collector-emitter path of the transistor 73. Further, because the RF signal input to the mixer is coupled in through the transformer 34, the mixer 2 can be biased with an increased collector-emitter voltage for the transistors T1–T4. The increases collector-emitter voltage allows the mixer 2 to achieve a higher gain by using a larger load resistor R1, R2. Thus, the mixer 2 achieves a higher voltage swing while maintaining the linearity for a given bias current.

Coupling the drive amplifier 6 to the mixer 2 via the transformer 34 provides for several additional advantages: A conversion from a single-ended signal (RF_OUT2) to a differential signal RF+, RE− suppresses even order distortion. The use of a single-ended gain stage (drive amplifier 6) helps in achieving a lower noise figure. Operating the mixer 2 at a lower bias current than the drive amplifier 6 also helps in achieving a lower noise figure. The increased collector emitter voltage in the mixer 2 provides for a higher power output for a given power supply VCC.

In one embodiment, the circuitry of the LNA amplifier 4 and the drive amplifier 6 coupled to the mixer 2 via the transformer 34 provides for a gain of more than 14 dB, a noise figure of less than 2 dB and an IP3 of more than +5 dBm for the LNA amplifier 4, and a gain of about 14 dB, a noise figure of less than 8 dB and an IP3 of more than +5 dBm for the mixer 2.

Another advantage of the circuitry is that the power consumption is low due to the reuse of the DC current in the LNA amplifier 4 and the drive amplifier 6. A low power consumption is highly desired in cellular phones because the lower the power consumption, the longer the phone's battery lasts. This means that a smaller battery can be used allowing manufacturers to develop smaller cellular phones which also feature an extended stand-by operation and talk time.

As shown in FIG. 1C, the transformer 34 reuses the DC current from the LAN amplifier 4 in the drive amplifier 6. This reuse of the DC current allows to save power consumed by the LNA amplifier 4 and mixer 2 which is a particular advantage of the embodiment of the present circuitry as discussed above.

Furthermore, it is of a particular advantage that the circuitry has an "IF trap" for the IF frequency. The resonant circuit formed by the inductor 41 and the capacitor 43 allows the DC current to flow through the inductor 41 without disturbing the DC biasing. At the IF frequency, the IF trap implements an "open" circuit. That is, the impedance at and near the resonant frequency for current flowing out of the terminal 40 of the transformer 34 is high. This high impedance lowers the gain at the IF frequency of a parasitic gain path that allows inherent thermal noise from the biasing circuits to reach the output 116 (FIG. 5). Reducing the amount of thermal noise that reaches the output reduces the noise figure of the circuit.

While the above detailed description has shown, described and identified several novel features of the invention as applied to a preferred embodiment, it will be understood that various omissions, substitutions and changes in the form and details of the described embodiments may be made by those skilled in the art without departing from the spirit of the invention. Accordingly, the scope of the invention should not be limited to the foregoing discussion, but should be defined by the appended claims.

What is claimed is:

1. A hand-held communications device, comprising:
   a mixer, the mixer configured to receive a first signal having a first frequency and a second signal having a second frequency, and to output a third signal which is a function of the first and second signals;
   an amplifier module, the amplifier module comprising a first amplifier stage and a second amplifier stage and configured to amplify a radio frequency signal which is input into the mixer as the first signal, the first and second amplifier stages being in communication via a first signal path and a second signal path; and
   an interface circuit, the interface circuit interposed between the mixer and the amplifier module, and inserted into the second signal path so that a DC bias current flows between the first amplifier stage and the second amplifier stage through the interface module.

2. The hand-held device of claim 1, wherein the interface module is a transformer having a first and a second winding.

3. The hand-held device of claim 1, further comprising a filter inserted into the first signal path.

4. The hand-held device of claim 3, wherein the filter is a band pass filter.

5. The hand-held device of claim 1, wherein the amplifier module is configured to operate at a frequency of approximately 800 MHz.

6. The hand-held device of claim 1, wherein the amplifier module is configured to operate at a frequency of approximately 900 MHz.

7. The hand-held device of claim 1, wherein the amplifier module is configured to operate at a frequency of approximately 1800 MHz.

8. The hand-held device of claim 1, wherein the amplifier module is configured to operate at a frequency of approximately 1900 MHz.

9. The hand-held device of claim 1, wherein the second signal is generated by a local oscillator.

10. The hand-held device of claim 1, wherein the mixer, the amplifier module and the interface circuit are integrated on a silicon substrate.

11. The hand-held device of claim 1, wherein the first amplifier is a low-noise amplifier and the second amplifier is a drive amplifier.

12. The hand-held device of claim 1, wherein the hand-held communications device is a cellular phone.

13. The hand-held device of claim 1, wherein the hand-held communications device is a wireless phone.

14. An apparatus for generating an intermediate signal, comprising:
   a mixer, the mixer configured to receive a first signal having a first frequency and a second signal having a second frequency, and to output a third signal which is a function of the first and second signals;
   a circuit module, the circuit module comprising a first circuit stage and a second circuit stage and configured to modify an electrical signal which is input into the mixer as the first signal, the first and second circuits being in communication via a first signal path and a second signal path; and
   an interface circuit, the interface circuit interposed between the mixer and the circuit module, and inserted into the second signal path so that a bias current flows between the first circuit and the second circuit via the interface module.

15. The apparatus of claim 14, wherein the bias current is a direct current.

16. The apparatus of claim 14, wherein the interface module is a transformer having a first and a second winding.

17. The apparatus of claim 16, wherein the transformer is a balanced transformer.

18. The apparatus of claim 14, further comprising a filter inserted into the first signal path.

19. The apparatus of claim 14, wherein the mixer, the circuit module and the interface circuit are integrated on a silicon substrate.

20. The apparatus of claim 14, wherein the mixer is a double-balanced mixer.

21. The apparatus of claim 20, wherein the mixer outputs a differential signal as the third signal.

22. The apparatus of claim 20, wherein the mixer output a single-ended signal as the third signal.

23. The apparatus of claim 14, wherein the first circuit stage is a low-noise amplifier and the second circuit stage is a drive amplifier.

24. The apparatus of claim 23, wherein the bias current is determined by the drive amplifier.

25. The apparatus of claim 23, wherein the drive amplifier is associated with a voltage source, the drive amplifier comprising a first transistor and the voltage source comprising a second transistor, the first transistor being about twenty times larger than the second transistor.

26. The apparatus of claim 23, wherein the low-noise amplifier comprises a network associated with the second signal path.

27. The apparatus of claim 26, wherein the drive amplifier is associated with a voltage source that comprises a current source providing a current of about 0.5 mA, and wherein the voltage source and the drive amplifier are configured so that the DC bias current is about twenty times bigger than the current provided by the current source.

28. The apparatus of claim 26, wherein the network comprises inductors and capacitors selected to provide a connection for the bias current.

29. The apparatus of claim 26, wherein the network comprises inductors and capacitors selected to provide a low impedance connection to ground for AC signals.

30. An apparatus for amplifying an electrical signal, comprising:
   an amplifier module, the amplifier module comprising a first amplifier stage and a second amplifier stage and configured to amplify the electrical signal, the first and second amplifier stages being in communication via a first signal path and a second signal path; and
   an interface circuit, the interface circuit interposed into the second signal path so that a bias current flows between the first amplifier stage and the second amplifier stage via the interface circuit, whereas the first signal path conveys a radio frequency signal.

31. The apparatus of claim 30, wherein the interface circuit is a transformer having a first and a second winding.

32. The apparatus of claim 31, wherein the transformer has a ratio of 1:1.

33. The apparatus of claim 31, wherein the transformer is a balanced transformer.

34. The apparatus of claim 30, further comprising a filter inserted into the first signal path.

35. The apparatus of claim 30, wherein the bias current is a direct current.

36. The apparatus of claim 30, wherein the amplifier module is configured to operate at a frequency of approximately 800 MHz.

37. The apparatus of claim 30, wherein the amplifier module is configured to operate at a frequency of approximately 900 MHz.

38. The apparatus of claim 30, wherein the amplifier module is configured to operate at a frequency of approximately 1800 MHz.

39. The apparatus of claim 30, wherein the amplifier module is configured to operate at a frequency of approximately 1900 MHz.

40. The apparatus of claim 30, wherein the amplifier module and the interface circuit are integrated on a silicon substrate.

41. The apparatus of claim 30, wherein the first amplifier is a low-noise amplifier and the second amplifier is a drive amplifier.

42. The apparatus of claim 41, wherein the bias current is determined by the drive amplifier.

43. The apparatus of claim 41, wherein the drive amplifier is associated with a voltage source, the drive amplifier comprising a first transistor and the voltage source comprising a second transistor, the first transistor being about twenty times larger than the second transistor.

44. The apparatus of claim 43, wherein the voltage source comprises a current source providing a current of about 0.5 mA, and wherein the voltage source and the drive amplifier are configured so that the bias current is about twenty times bigger than the current provided by the current source.

45. The apparatus of claim 41, wherein the low-noise amplifier comprises a network associated with the second signal path.

46. The apparatus of claim 45, wherein the network comprises inductors and capacitors selected to provide a connection for the bias current.

47. The apparatus of claim 45, wherein the network comprises inductors and capacitors selected to provide a low impedance connection to ground for AC signals.

48. A method for generating an intermediate signal, comprising the steps of:
   providing an apparatus comprising a mixer, a circuit module which comprises a first circuit and a second circuit and an interface circuit, the interface circuit interposed between the mixer and the circuit module;

operating the first and second circuits so that a current flows between the first and second circuits via the interface circuit;

modifying a first signal with the first circuit and feeding the modified first signal to the second circuit;

modifying the modified first signal with the second circuit to generate a second signal;

generating a third signal, the third signal being dependent from the second signal; and mixing the third signal and a fourth signal with the mixer to generate the intermediate signal.

49. The method of claim 48, wherein the steps of modifying include amplifying the signals.

50. The method of claim 48, further comprising the step of filtering the modified first signal with a filter interposed between the first and second circuits.

51. The method of claim 48, wherein the step of generating the third signal includes converting the second signal into a differential signal.

52. The method of claim 48, wherein the step of generating the third signal includes feeding the second signal to a first winding of the interface circuit and outputting the third signal from a second winding of the interface circuit.

53. The method of claim 48, wherein the step of operating the first and second circuits includes feeding the current from the first circuit to the second circuit.

54. A method for amplifying an electrical signal, comprising the steps of:

providing an apparatus comprising a circuit module which comprises a first circuit and a second circuit and an interface circuit, the interface circuit associated with the circuit module and an output of the apparatus, wherein the first and second circuits being in communication via the first signal path and a second signal path;

modifying a first signal with first circuit and feeding the modified first signal to the second circuit via the first signal path;

operating the first and second circuits so that a current flows between the first and second circuits via the second signal path within the interface circuit;

modifying the modified first signal with the second circuit to generate a second signal; and generating a third signal, the third signal being dependent from the second signal.

55. A method for amplifying an electrical signal, comprising the steps of:

interconnecting a first amplifier stage, an interface circuit, and a second amplifier stage, wherein the first amplifier stage and the second amplifier stage being in communication via a first signal path and a second signal paths;

conveying a first radio signal between the first amplifier stage and the second amplifier stage on the first signal path;

conveying a bias current through the interface circuit; and conveying a second radio signal through the interface circuit.

56. The method of claim 55, wherein the step of conveying the bias current through the interface circuit includes conveying a direct current through a primary winding of transformer.

57. The method of claim 55, wherein the step of conveying the radio signal through the interface circuit includes conveying the radio signal through a primary winding of transformer.

58. An apparatus for amplifying an electrical signal, comprising:

means for amplifying the electrical signal, the amplifying means comprising a first and a second means for amplifying the electrical signal, the first and second amplifying means being in communication via a first signal path and a second signal path; and means for interfacing, the interfacing means being interposed into the second signal path so that a bias current flows between the first amplifying means and the the second amplifying means via the interfacing means, whereas the first signal path conveys a radio frequency signal.

59. A method for amplifying an electrical signal, comprising the steps of:

interconnecting a first amplifier stage, an interface circuit, and a second amplifier stage;

conveying a bias current through the interface circuit by conveying a direct current through a primary winding of transformer; and conveying a radio signal through the interface circuit.

* * * * *